Nov. 5, 1946.   A. J. PHELAN ET AL   2,410,588
TURBINE BLADE AND ASSEMBLY THEREOF
Filed June 23, 1942   3 Sheets-Sheet 2
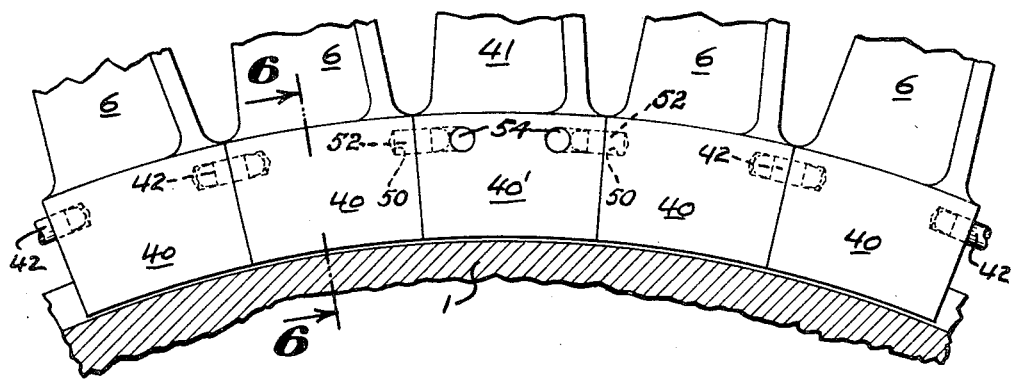
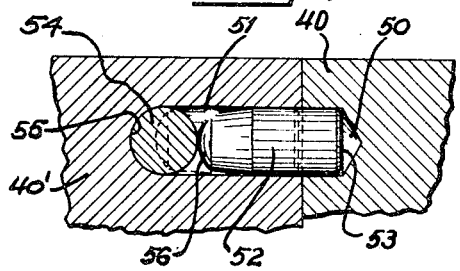
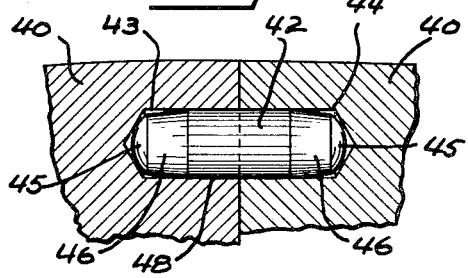
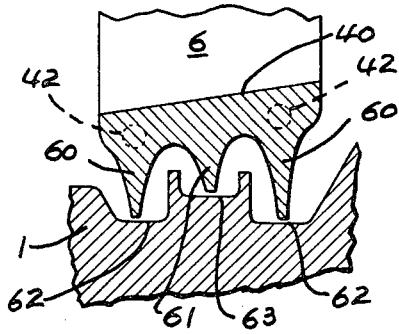
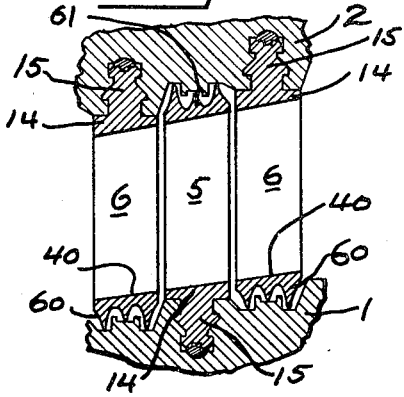
ARTHUR J. PHELAN. INVENTOR.
VLADIMIR H. PAVLECKA.
BY Lippincott & Metcalf
ATTORNEYS.

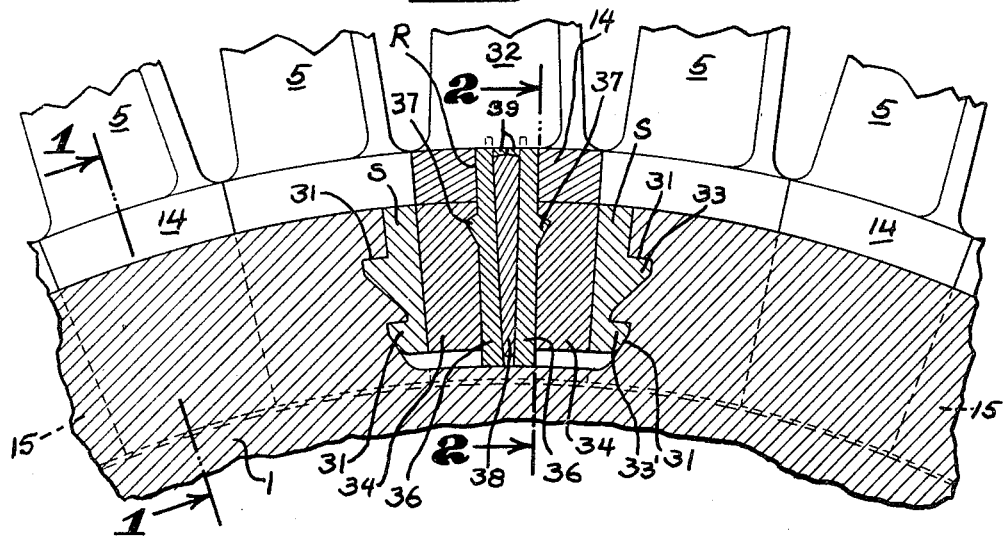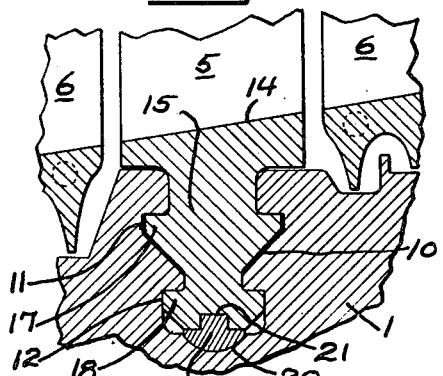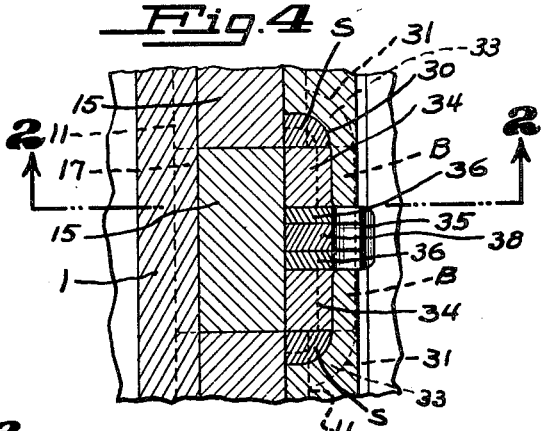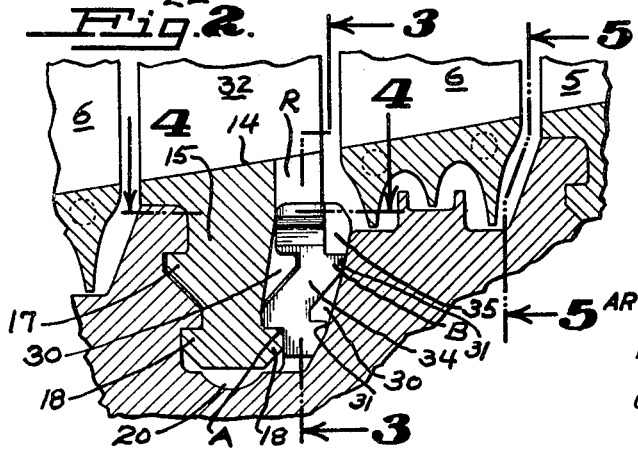

Patented Nov. 5, 1946

2,410,588

UNITED STATES PATENT OFFICE 2,410,588

TURBINE BLADE AND ASSEMBLY THEREOF

Arthur J. Phelan and Vladimir H. Pavlecka, Pacific Palisades, Calif., assignors to Northrop Aircraft, Inc., Hawthorne, Calif., a corporation of California Application June 23, 1942, Serial No. 448,132

10 Claims. (Cl. 253—77)

Our invention relates to turbine blades and to a means and method of assembling turbine blades in both rotor and stator structures, to provide an assembly positively locking blades of both stator and rotor in position.

Among the objects of our invention are: To provide a means and method of assembling rotor and stator blades in a turbine; to provide a means and method of interlocking turbine blades, when assembled on either a stator or rotor of the turbine; to provide a means and method of forming a shroud for each end of a turbine blade assembly; to provide a simple and effective labyrinth seal for a turbine blade; to provide a simple and strong means and method of assembling and interlocking a plurality of individual turbine blades on a basal structure, and to provide a turbine blade assembly ideally adapted to withstand temperatures used in gas combustion turbines.

In the drawings:

Fig. 1 is a longitudinal sectional view of a portion of a turbine showing how the fixed end of a turbine blade may be anchored in either rotor or stator in accordance with our invention.

Fig. 2 is a view in section of the blade insertion position, showing the locking arrangement for the last blade inserted.

Fig. 3 is a view partly in section, and partly in elevation, of a portion of a turbine rotor taken as indicated by the line 3—3 in Fig. 2.

Fig. 4 is a view partly in section and partly in elevation taken as indicated by the line 4—4 in Fig. 2.

Fig. 5 is a view partly in section and partly in elevation taken as indicated by the line 5—5 in Fig. 2 and showing the interlock of the face ends of stator blades.

Fig. 6 is a sectional view taken as indicated by the line 6—6 in Fig. 5.

Fig. 7 is an enlarged view partly in elevation and partly in section, showing the last pin arrangement in the assembly of blades as shown in Fig. 5.

Fig. 8 is a view partly in section and partly in elevation of the pin connection between all but the last blades and the adjacent blades.

Fig. 9 is a diagrammatic view partly in section and partly in elevation showing how the turbine blades alternate in position on the rotor and stator.

Figure 10:
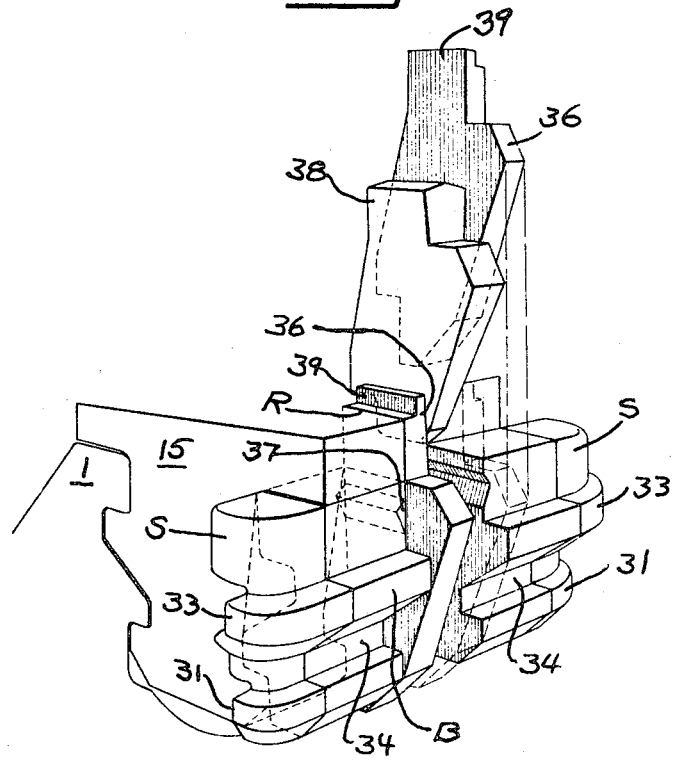
Fig. 10 is a phantom perspective view of a partially assembled anchoring structure.

The class of turbo machines with which the present invention is more directly concerned is known as the axial flow type, and is character- ized by an arrangement of axially spaced circular rows of alternate rotor and stator blades which are anchored to their respective rotor and stator bodies and extend radially toward the opposite member, terminating in a labyrinth seal and shroud, which prevents leakage around the ends of the blades with consequent loss of efficiency.

Internal leakage is not combatted in the prior art of turbine designing at all, in spite of the fact that it adversely influences the thermodynamic efficiency of the turbine. In general, leakage can be defined as leakage of gases past the blade stages without doing useful work on the blades. It not only constitutes a direct and non-recoverable loss of gas energy, but also has an adverse indirect effect upon the flow of gases through blade cascades, in that it disturbs the substantially two dimensional flow of gases and induces it to deviate outwardly in the direction of the blade tips. This flow then sets up a tip vortex at the end of each blade, which is the source of the so-called induced drag. For blades of low aspect ratios, such as are common in the high pressure stages of elastic fluid turbines, this drag is of considerable importance, because in the elastic fluid turbine, the absolute velocity of the leaking gases is higher than the relative velocity of the gases expanding in the blade cascade and the tip vortex can be extremely strong.

In our invention the individual blade stages are sealed along their periphery by labyrinth flanges to reduce the stage leakage to the very minimum and also to remove the place of leakage away from the tips of the blades, so that even if a slight leakage does occur through the labyrinth seal, it has only a remote influence on the two-dimensional flow through the blade cascade. Furthermore, we desire to encastré the ends of both stationary as well as rotary blades by a peripheral shroud, with the peripheral shroud forming the base of the labyrinth seals.

Obviously, however, it would not be practical to make the entire wheel of radial blades as a unit, and the present invention is directed toward a means and method of forming a blade wheel with the bases of the blades locked in place in either the stator or rotor, and with the peripheral ends of the individual blades joined to form a continuous shroud and a continuous seal between stages.

In a gas combustion turbine, for which our construction is ideally suited, the difficulties attendant upon high temperature of the propulsive gases manifest themselves in various ways. One of the most important of these is the "creep"

or gradual deformation of material under stress. The rate of creep varies with the stress and also with the temperature. The variation with stress is approximately linear, but the variation with temperature is exponential, i. e., the rate of creep increases in geometric ratio while the temperature is increasing in arithmetic ratio. This phenomenon constitutes one of the greatest obstacles to the use of high temperature thermodynamic cycles in gas turbine plants. If the turbine blading or its supporting structure creeps, there will eventually come a time when the clearances between the rotor and stator disappear, and replacement of these parts is necessary. Therefore, if the turbine be designed with small clearances and very low stage leakage for initially high thermodynamic efficiency, and the temperature of the gases in the first stages of the turbine also be high for the same purpose, it is quite possible that the creep rate will be so high that replacement of the turbine components will be necessary in a relatively short time, and that savings due to high thermal efficiency will be more than offset by large rebuilding costs.

The problem thus briefly set forth is complicated by an additional factor, e. g., the vibration damping properties of the metals used for the construction of the turbine blading. Turbine blades exposed to high temperature gases should be made of special heat resisting non-oxidizing alloys which possess very low creep rates such as "K-42-B" and ATV-3. An important disadvantage of these alloys is their low internal cohesive friction at high temperatures, physically defined as low damping coefficient. Parts of turbines made of these materials, e. g., bladings, are easily excited into violent vibrations even outside the region of resonance with the exciting forces, and may develop fractures. A turbine structure using these alloys should be designed with this condition in mind, viz., to restrain the blades against dangerous vibrations without detrimentally affecting the performance of the turbine as an aerodynamic machine. The tops of all blades, therefore, are tied together by rigid sealing rings which encastré the free ends of the blades, and thus rigidity of the blades is increased and the resonant frequency response is greatly reduced.

Broadly as to method, our invention comprises forming a single turbine blade having a basal section at one end, and a shroud section at the other end, each of these sections mating with the similar surface on the next adjacent blade in the circular row. The basal sections are provided with teeth engaging a circular channel, having tooth engaging ridges in the stator and in the rotor, the stator blade not being subject to centrifugal forces, they may be designed with only one ridge. Each blade, as far as the basal portion thereof is concerned, is loaded into the channel from a loading position and slid around the channel until the blades meet and the channel is full. In case of the rotor, a special last blade is then inserted and locked in place. In case of the stator no special locking blade basal section is required, because the assembly of blades into the housing is accomplished while the housing is in two separate halves.

At the same time the peripheral ends of each blade are mated with the next adjacent blade, these end portions are pinned together as between blades, with special locking pins on the last blade to coordinate all the blade end sections into a continuous shroud.

Thus, the bases of all the blades are all securely interlocked and firmly inserted in the rotor or stator to which they are attached, and the peripheral ends of the blades have their shroud portions interlocked to form a substantially continuous shroud. This shroud preferably carries, on the outer surface thereof, labyrinth channels cooperating with labyrinth ridges in the opposite stator, to form the seal around the blades. Due to the use of this construction centrifugal and power forces are adequately cared for, and the blade wheel rotates substantially as a unit.

Broadly as to apparatus, our invention comprises a foundation member which may be either the rotor or stator of a turbine, in which an under-cut channel is formed, together with a plurality of turbine blades having basal portions fitting this channel. On the rotor at two certain points in diametrical opposition around the channel two openings are provided through which the individual blades may be assembled one by one and moved around the channel not more than 90° on the arc until a last blade is to be inserted to complete the circle. At this point a special locking arrangement is utilized, this locking arrangement being such that no blade stresses are carried thereby, all stresses on the last blade being delivered directly to the foundation member.

As the blades are being assembled in the foundation member, their tips are also mating on their peripheral ends to form a continuous shroud, the shroud portions being tied together by locking pins, with special locking pins being provided on the last blade. The entire structure becomes with the foundation member a wheel acting, as far as the forces imposed thereon are concerned, as a unit.

We also prefer to provide, on the peripheral face of each blade wheel, a labyrinth seal base comprising peripheral surfaces facing stationary flanges with respect to which the wheel rotates, these flanges clearing by a minute dimension the peripheral surfaces of the blade tips. A solid unitary construction is thereby produced with a minimum of internal leakage between stages.

Our invention may be more fully understood by direct reference to the drawings, with first reference to the basal portions of the blades. These portions of the blades may be inserted in either the rotor or the stator, as in most turbines the rotor and stator blades are alternated as shown in Fig. 9. In the drawings, for ease of description, the lower member 1 may be termed the rotor and the upper member 2 may be termed the stator. Therefore, the rotor 1 will be surrounded by the stator 2.

In Fig. 1 we have shown a rotor blade 5 attached to the rotor 1, and two stator blades 6 in proper adjacent position. Under these conditions when the rotor 1 rotates blade 5 will rotate with it, whereas blades 6 will be stationary. In this figure blade 5 represents one radial blade of a complete circular row of blades, and blades 6 represent one radial blade of two complete rows of adjacent stator blades. Each circular row of blades will hereafter be called a stage.

Considering always in the drawings therefore, that the lower foundation member is the rotor and also considering that the method of inserting the blades in either the rotor or the stator is the same in principle, we will next turn to the description of the insertion of the base of the blades in the rotor as shown in Figs. 1 to 4 inclusive.

Referring first to Fig. 1, the rotor 1 is provided with a circular anchorage channel 10. This anchorage channel is undercut to provide an upper tooth channel 11, and a lower tooth channel 12, on each side thereof. All of the individual blades but two, located diametrically in opposition, which will be known hereafter as the last blades, are provided with a basal portion 14 carrying the blade 5. Obviously, the latter may be of any desired section as adapted to further the function of the turbine. Basal portion 14 is also provided with a tooth extension 15 having thereon on each side an upper tooth 17 and a lower tooth 18, loosely fitting tooth channels 11 and 12 respectively on both sides of anchorage channel 10. The general fit of the upper teeth in the upper channel is complete. The lower end of the extension 15, however, does not reach to the bottom of anchorage channel 10, but terminates short thereof, channel 10 being provided with a circular bottom portion 20, with extension 15 provided with a square section channel 21. A blade wedge 22 is fitted in both latter channels. This blade wedge is such, as far as dimensions are concerned, as to force extension 15 upwardly, to take up all clearance between the teeth and the teeth channels, so that after the blade extension 15 is in place, and wedge 22 inserted, the blade extension 15 is firmly wedged into place.

Inasmuch as extensions 15 are provided with projecting teeth, and inasmuch as channel 10 is under-cut with tooth engaging channels, it is desirable that a certain construction be provided on the extent of the channel 10, so that the blade extensions 15 may be inserted and the blades moved circularly around in the channel 10 to their proper positions, this movement taking place before wedges 22 are inserted.

We therefore provide at two positions at least around the periphery of the rotor an opening 30 extending laterally from channel 10 opening between adjacent rows of blades as shown in Figs. 2 and 4. Here the lateral opening 30 is shown with an arcuate length slightly greater than the length of one basal blade portion 14. This opening is made sufficiently wide at that point to allow the insertion and the retraction of the milling cutter for cutting tooth channels 11 and 12 and for the insertion of extension 15 of each blade. This opening 30 is also undercut with locking channels 31 made by the same milling cutter that is used to cut the tooth channels 11 and 12 so that its outer wall section is the same as that of one side of main channel 10. All of the blades, except one, can be inserted into channel 10 through opening 30 and then moved laterally with respect to the channel until the teeth on the opposite side of the basal portion 15 register with the tooth channels 11 and 12. The blades can then be moved arcuately around the channel, one by one, until the entire wheel or stage is completed with the exception of two last diametrically opposite blades 32, as shown in Fig. 3.

Last blade 32 has both lower teeth 18, but only one upper tooth 17 on one side thereof, the upper tooth 17 on the side toward the opening 30 being omitted. This last blade, after all the remaining blades are in position, is then dropped in through opening 30 and moved laterally in the channel until the teeth opposite opening 30 engage channels 11 and 12. The last blade 32 is then ready to be locked in place. The fit is exact.

It will be noted that the ends of opening 30 are arcuately formed and undercut. We therefore, position at each of these two end points, a spacer S having arcuate teeth 33 and 33' thereon fitting the end spaces made in opening 30 by the milling cutter. These spacers S also have inside tooth channels milled therein forming an extension and continuation of channels 10 and 11 to fit teeth 17 and 18 on the two blades adjacent the last blade 32. The spacers S are dropped in opening 30 and then moved arcuately into position. Thus spacers S are locked to the rotor and are also locked to the adjacent blades 17 and 18. They cannot come out of their end spaces except by being moved arcuately toward each other and the center of space 30.

The spacers are prevented from moving out of the corners of space 30 by the use of a pair of locking bars 34, each bearing against an end spacer S. These lock bars are of such a size and shape that they can be inserted in space 30 to fit continuation channels 31 through a central notch 35 cut through the rotor and through the outer wall of opening 30 into top and bottom tooth continuation channels 31 in the rotor. A recess R is also provided in base 14 of blade 32 opposite notch 35. The lock bars also have a notch A engaging lower tooth 18 on the last blade and a shoulder B shaped to fit top continuation channel 31, in the wall of space 30.

The first lock bar is dropped through notch 35 and then forced arcuately against one end spacer S, and the other lock bar 34 is inserted and moved in the opposite direction against the other end spacer S. Thus it will be seen that each lock bar 34 bears at the bottom against the bottom tooth 18 of the last end blade, and bears at the top against top continuation channel 31 underneath rotor material. In this position therefore, the last blade 32 is firmly locked in position as far as radial forces are concerned.

It then remains only to fill the space between the two locking bars 34—34. This is done by inserting a pair of wedge plates 36—36 in notch 35 each abutting a lock bar 34. Each of these wedge plates 36 has a tooth 37 thereon fitting a cooperating channel in each lock bar 34. Wedge plates 36 are forced apart arcuately by a central wedge 38, this wedge being driven between the two wedge plates 36 until the head thereof is slightly below the upper surface of the adjacent wedge plate. A pair of projecting portions 39 are provided, one on each wedge plate, and these projecting portions 39 are then peened over toward each other over the top of the wedge 38, to prevent the wedge from coming out. Wedge plates cannot come out because they are interlocked with lock bars 34. Lock bars cannot come out because they have a portion in top channel 31, and end spacers S cannot come out because they cannot move centrally.

Summarizing therefore, in the assembly sequence of the basal portion of the blades in either the rotor or the stator, using the rotor as an example, the blades 5 are inserted one by one in channel 10 through opening 30 and moved arcuately in channel 10 until they each reach their final position. At this point wedge 22 is inserted beneath the blade to fix the blade in arcuate position. The next blade is then moved up into abutting relationship and its wedge inserted, and so on until the entire assembly with the exception of one blade has been made. After the blades on either side of the last blade have been moved into position and locked therein by the insertion of their wedges 22, end spacers S are positioned to interlock the adjacent blades and the rotor, then the last blade 15 is dropped into place and moved laterally in the channel until the teeth thereon engage the opposite teeth channels. Next locking keys 34 are dropped through notch 35 and moved arcuately into position against end spacers S, and against the basal portion 15 of the last blade. Wedge plates 36 are then dropped in position and the central wedge 38 driven home. After all the parts are solidly in position, projections 39 are peened over the central wedge 38 and the last blade 5 is firmly locked in position.

If at any time it is desired to remove any of the blades, the peened over projections 40 may be cut away, central wedge 38 drawn, and the parts then disassembled in the reverse order until the last blade 32 is removed, whereupon any of the other blades can be moved around to the loading position and removed.

It will be noted therefore that in assembling the various blades on the rotor as above described, or on the stator in exactly the same way, the adjacent blade base faces abut. Inasmuch as the faces are such as to provide for exact fit, the blades are, for all operating purposes, an integral part of the rotor or stator and form an integral ring.

It will be obvious from the description already given, that the method of assembly of the bases of the blades can be utilized if desired to assemble blades having free peripheral ends, in a rotor or stator structure. However, for many purposes it is desirable that the peripheral ends of the blades be tied together, as for example, to form a shroud. It is also desirable many times that this shroud carry a labyrinth seal, as pointed out above. In Figs. 5 to 10 therefore, we have shown how we prefer to connect the peripheral ends of the blades, whether the outer periphery, as with the rotor blades, or the inner periphery, in case of stator blades.

In Fig. 5, we have shown the peripheral ends of stator blades 6 and their relationship to the rotor 1. The same method however, of connecting the outer peripheral ends of the rotor blades is also utilized.

Referring therefore directly to Fig. 5, the peripheral ends of blades 6 are provided with end portions 40. These end portions have adjacent faces mating to form a shroud connecting all of the blades. As the blades are assembled one by one (as has been previously described with respect to the rotor) in the stator frame 2, the outer portions 40 of all but the last stator blade 41 are tied together by the use of a cross-pin 42 entering facing recesses 43 and 44 in adjacent blades. Cross-pins 42 are provided with rounded ends 45, and a slight bevel 46 extends from the rounded end 45 to the main cylindrical body 48 of the pin. When each blade is assembled, two pins 42 are positioned between them. As end portions 40 are abutted, the pins enter both apertures 43 and 44 with a tight fit, providing absolute centering of adjacent blades.

Last stator blade 41 however, is interlocked in a slightly different manner. The blades adjacent to final stator blade 41 utilize a short recess 50 facing the last stator blade 41, and last stator blade 41 has facing each special recess 50, an elongated pin recess 51 in which a half-pin 52 is mounted with a flat end 53 flush with the face of end portion 40'. Thus stator blade 41 can be inserted with opposite pins 52 in place entirely enclosed within the end portion 40' of the last stator blade 41.

After the last stator blade 41 has been positioned in the blade assembly, locking wedges 54 are inserted each having a pointed end projecting laterally in a locking pin aperture 55, open to the side surface of the end portion 40'. The inner end of each locking wedge 54 will engage round end 56 of each half-pin 52, and force the half-pins 52 into the special recesses 50 in the adjacent blades, thus locking the end blade to both adjacent blades. Once locking wedge 54 is in place, the metal of 40' may be peened around the pin so that it cannot come out, an outer bevel being provided for that purpose. Thus, the peripheral ends of all the blades are in abutting relationship to form a ring shroud encastring the blades, and this relationship is always maintained as the end of each blade is pinned to the ends of both adjacent blades.

The individual blade rows are preferably sealed along their peripheral ring by labyrinth flanges to reduce stage leakage to the minimum, and also to remove the place of leakage away from the tips of the blades, so that if even a slight leakage should occur through the labyrinth seal, it has only a remote influence on the two dimensional flow through the blade cascade.

As the ends of both stationary as well as rotary blades are encastred by a shroud ring formed by the abutting peripheral portions 40 of the various blades, the peripheral portions 40 can be shaped to carry a plurality of arcuate side flanges 60, longer than a central flange 61. These flanges are coextensive around the shroud ring, and therefore unite to form three completely circular sealing flanges. Each of the flanges 60 projects adjacent a continuous arcuate flange seat channel 62 cut into the opposing rotor or stator, and the central flange 61 is positioned adjacent a central flange seat channel 63. The sealing flanges are originally machined to a close fit with the flange seat channels and may be run in under power before the turbine is actually used for the first time, or may be designed to have a small running clearance at operating temperatures.

The gases in passing through from one side of the blade stage to the other, i. e., from a zone of pressure to a zone of lower pressure, must make five changes of direction in passing through the labyrinth seal. There can be no high velocity losses through such a seal, and there can be no leakage past the blade stages which can set up a tip vortex at the end of these blades, as can happen to produce induced drags in the usual type of turbine blades having free peripheral ends. The place of leakage is removed completely away from the tips of the blades and even if a slight leakage does occur through the labyrinth seal it has only a remote influence on the two dimensional flow through the blade cascades.

Thus, we have provided a turbine blade assembly and method of assembling turbine blades which can be used for both rotor and stator blades, in which the bases of the blades are securely and perfectly locked to either the rotor or the stator and in which the peripheral and outer ends of the blades are tied together to form a shroud, which shroud carries on its outer surface a labyrinth seal. Thus all of the blades are effectively tied together as a single unit to form a wheel which under the stresses of both rotary and power stresses, act substantially as a stage unit.

While our invention is ideally adapted for use in both compressor and gas turbine units of the gas combustion turbine described in the above cited application, it is obvious that any type of turbine blade may be assembled by the means and method described herein, with or without the peripheral shroud and labyrinth seal.

We claim:

1. In a turbine having rotor and stator elements, a circular blade stage on one of said elements comprising a plurality of separate turbine blade members having a base, an extension on said base, one of said elements having a circular channel therein, said circular channel being under-cut, and having a laterally expanded portion on one side of said channel, said expanded portion also being under-cut, a tooth on each of said blade member extensions loosely fitting said channel under-cut, said extensions being located in said channel and in abutting relationship to adjacent extensions of similar blade members, a wedge positioned between the bottom of said channel and the end of each extension to force said teeth against said channel under-cut and to stabilize said blade members, a last blade member in said enlarged portion of said channel, said last blade member having an extension tooth engaging said channel under-cut without clearance, a second tooth on said last blade member extension on the side thereof facing the under-cut on said enlarged portion, and a locking member engaging said second tooth and said last mentioned under cut.

2. In a turbine having rotor and stator elements, a circular blade stage on one of said elements comprising a plurality of separate turbine blade members having a base, an extension on said base, one of said elements having a circular channel therein, said circular channel being under-cut, and having a laterally expanded portion on one side of said channel, said expanded portion also being under-cut, a tooth on each of said blade member extensions loosely fitting said channel under-cut, said extensions being located in said channel and in abutting relationship to adjacent extensions of similar blade members, a wedge positioned between the bottom of said channel and the end of each extension to force said teeth against said channel under-cut and to stabilize said blade members, a last blade member in said enlarged portion of said channel said last blade having an extension tooth engaging said channel under-cut without clearance, a second tooth on said last blade member extension on the side thereof facing the under-cut on said enlarged portion, said enlarged portion having a locking member inserting notch in the under-cut wall thereof removing said latter under-cut, a locking member simultaneously bearing against said second tooth and the under-cut in said enlarged portion adjacent said notch, and means for preventing said locking member from moving back into said notch.

3. Apparatus in accordance with claim 2 wherein said notch is centrally located in the wall of said enlarged portion and centrally with respect to the base of said last blade member, the arcuate length of said notch being less than the arcuate length of the basal extension of the last blade member, and wherein a pair of said locking members are provided, one to either side of said notch, to engage said second tooth and the under-cut of the enlarged portion adjacent said notch, a wedge plate radially positioned in said notch on each side thereof, each of said wedge plates bearing against a locking member, means for preventing radial movement between said wedge plates and locking members, and a key wedge filling the space between said wedge plates.

4. Apparatus in accordance with claim 2 wherein said notch is centrally located in the wall of said enlarged portion and with respect to the base of said last blade member, the arcuate length of said notch being less than the arcuate length of the basal extension of the last blade member, and wherein a pair of said locking members are provided, one to either side of said notch, to engage said second tooth and the under-cut of the enlarged portion adjacent said notch, a wedge plate radially positioned in said notch on each side thereof, each of said wedge plates bearing against a locking member, means for preventing radial movement between said wedge plates and locking members, a key wedge radially driven to fill the space between said wedge plates, and means on each of said wedge plates and engaging the outer end of said key wedge to prevent outwardly radial movement of said key wedge.

5. Apparatus in accordance with claim 2 wherein said notch is centrally located in the wall of said enlarged portion and with respect to the base of said last blade member, the arcuate length of said notch being less than the arcuate length of the basal extension of the last blade member, and wherein a pair of said locking members are provided, one to either side of said notch, to engage said second tooth and the under-cut of the enlarged portion adjacent said notch, a wedge plate radially positioned in said notch on each side thereof, each of said wedge plates bearing against a locking member, means for preventing radial movement between said wedge plates and locking members, a key wedge radially driven to fill the space between said wedge plates, a deformable extension on the outer ends of said wedge plates, said deformable extensions being deformed over the outer end of said key wedge to prevent outwardly radial movement of said key wedge.

6. Apparatus in accordance with claim 2 wherein said notch is centrally located in the wall of said enlarged portion and with respect to the base of said last blade member, the arcuate length of said notch being less than the arcuate length of the basal extension of the last blade member, and wherein a pair of said locking members are provided, one to either side of said notch, to engage said second tooth and the under-cut of the enlarged portion adjacent said notch, a wedge plate radially positioned in said notch on each side thereof, each of said wedge plates bearing against a locking member, means for preventing radial movement between said wedge plates and locking members, a key wedge filling the space between said wedge plates, said expanded portion extending arcuately beyond both sides of the extension of the last blade member, the under-cut of said enlarged portion forming a continuation of a channel under-cut, with spacers filling said enlarged portion including the under-cut therein up to the ends of the last blade member extension, said locking members abutting said spacers to hold them in place.

7. A turbine blade member having a base extension formed with laterally extending teeth, said blade member terminating at its other end in a shroud segment having a locking pin receiving hole in each end wall thereof, with the axes of said locking pin receiving holes normal to said walls.

8. A turbine component, such as a rotor or stator, having a plurality of blade members radially extending therefrom, each of said blade members terminating in a shroud segment in abutment with the corresponding shroud segments of adjacently disposed blade members, and locking pins disposed within said shroud segments and crossing the joints between abutting surfaces of said segments with their axes normal to said abutting surfaces.

9. The method of locking the extremity of a blade member of a turbine stage to the extremity of an abutting blade member, where each blade member terminates in a shroud segment having a locking pin hole in each abutting surface thereof, comprising exposing one of said locking pin holes through the side wall of one of the abutting shroud segments at a point spaced from the abutting surface of said segment, inserting a locking pin entirely within said exposed locking pin hole prior to assembling the blade member into position, aligning the locking pin holes of abutting surfaces, and applying pressure through said side wall exposure to the exposed end of said locking pin to force said locking pin to span the joint between said abutting surfaces.

10. A turbine component as in claim 8 wherein said shroud segment terminates radially in a plurality of labyrinth seal flanges.

ARTHUR J. PHELAN.
VLADIMIR H. PAVLECKA.